June 12, 1928. 1,672,913
R. L. SCHAAP
MICROMETER MEASURING TAPE
Original Filed April 9, 1923  2 Sheets-Sheet 1
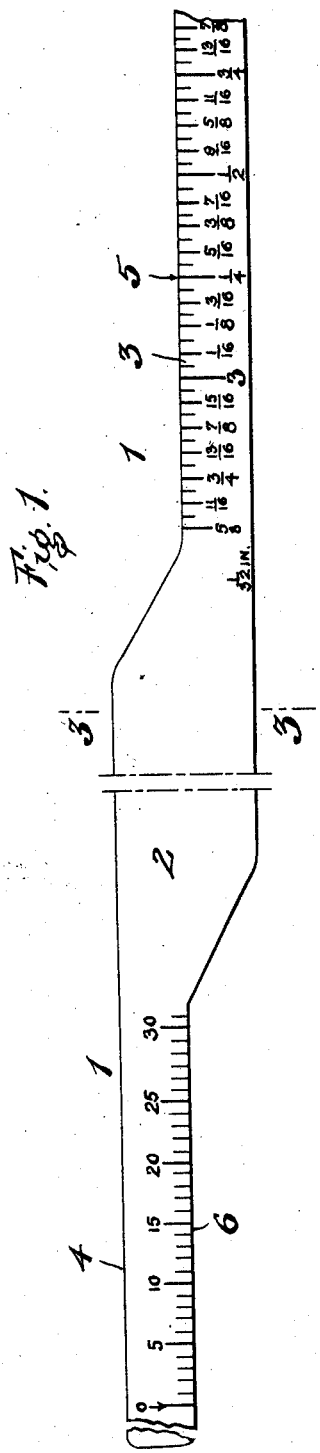
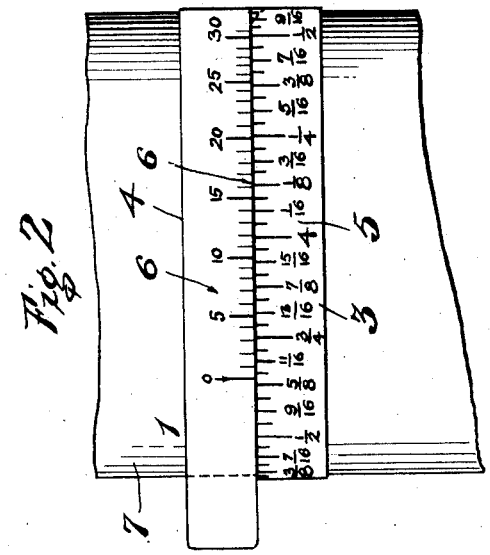
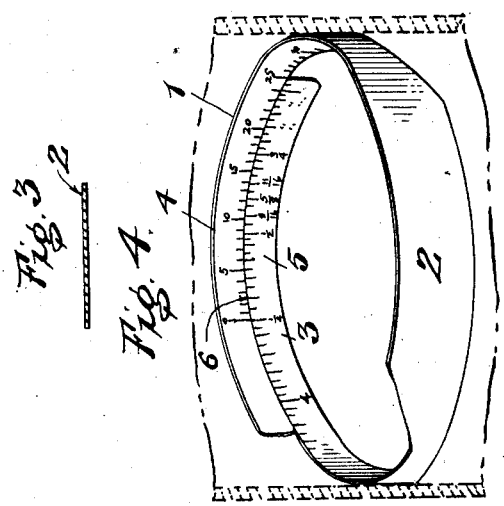
Inventor
Robert L. Schaap
By his Attorney June 12, 1928.  R. L. SCHAAP  1,672,913
MICROMETER MEASURING TAPE
Original Filed April 9, 1923  2 Sheets-Sheet 2
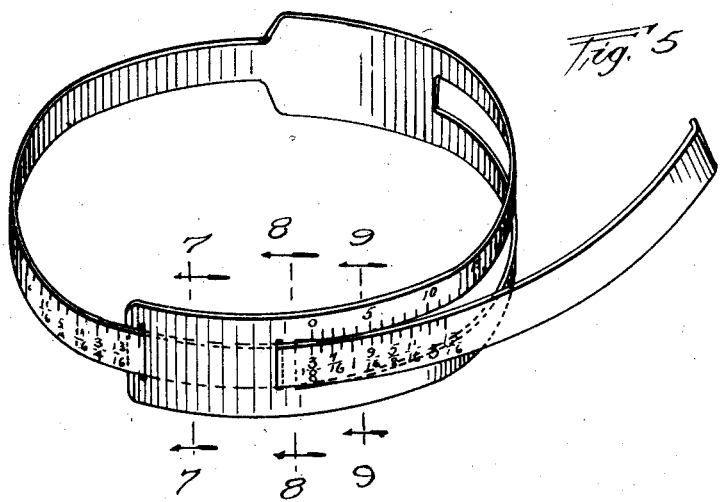
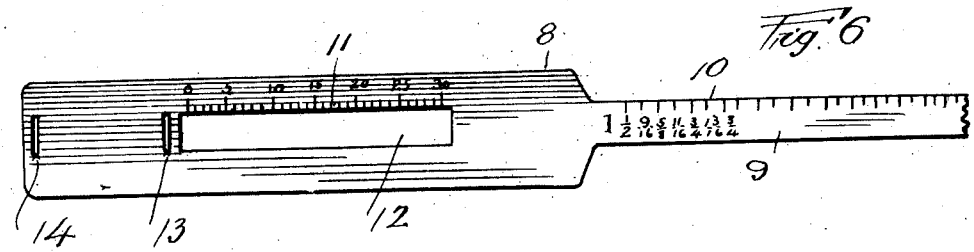
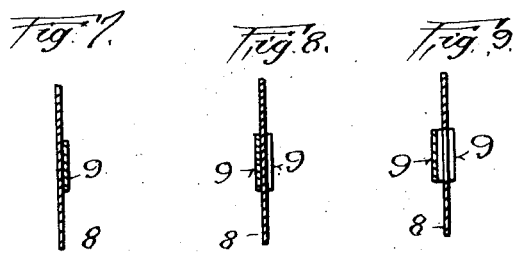
INVENTOR
Robert L. Schaap
BY
O. Ellery Edwards
HIS ATTORNEY Patented June 12, 1928.

1,672,913

UNITED STATES PATENT OFFICE.

ROBERT L. SCHAAP, OF NEW YORK, N. Y.

MICROMETER MEASURING TAPE.

Application filed April 9, 1923, Serial No. 630,813. Renewed November 12, 1927.

The object of my invention is to provide a suitable tape for measuring the diameter of cylinders or cylindrical surfaces whether exterior or interior within one-thousandth of an inch by means of a tape measure, the markings of which are separated by a convenient distance, say approximately one-tenth of an inch, more or less. This object is accomplished by my invention, one embodiment of which is hereinafter more particularly set forth.

For a more detailed description of my invention, reference is to be had to the accompanying drawings, forming a part hereof, in which Figure 1 is a plan view of my improved measuring tape.

Figure 2 shows the same applied to a cylinder, and

Figure 3 is a sectional view, taken on the line 3—3 of Figure 1.

Figure 4 is a perspective view showing how this tape is used to determine the diameter of bores.

Figure 5 is a perspective view of a modified form of my invention.

Figure 6 is a development of a portion of the structure shown in Figure 5.

Figures 7, 8 and 9 are sectional views, taken as indicated by lines 7—7, 8—8 and 9—9, respectively, on Figure 5, looking in the direction of the arrows.

Throughout the various views of the drawings, similar reference characters designate similar parts.

My improved tape 1, in the preferred embodiment, is made with a broad body portion 2 and offset ends 3 and 4 which have measured edges 5 and 6 respectively, which are adapted to be brought together, as shown in Figure 2, when the tape is wrapped around a cylindrical object 7, or as shown in Figure 4 for internal measurements. It will be noticed that for external measurements the edge 5 may be marked in any standard way as in inches multiplied by $\pi$ or approximately $3\frac{1}{7}$ plus the thickness of the tape, say .005 of an inch and for internal measurements this thickness should be subtracted instead of added. This will make each representation of an inch substantially $3\frac{1}{7}$ inches long and the fractional measurements will be made to correspond. The other edge 6 is on a corresponding scale where the markings correspond to those on the edge 5, as is usual with verniers, which means that if the gradations are in thirty-seconds multiplied by $\pi$ plus, as just above described, the markings on the edge 6 will be the same multiplied by $\frac{31}{32}$ so that when the edges 5 and 6 are brought together, as shown in Figure 2, a vernier effect is produced. Thus, supposing the cylinder 7 shown in Figure 2 is a little more than three inches in diameter, say $5\frac{5}{8}$ plus .625 plus .005, which added together make in decimals 3.630.

In the foregoing embodiment the ends will not be held together and so will fly apart when released. It it is desirable to keep these ends together, as is sometimes the case, the embodiment of my invention shown in Figures 5 to 9 inclusive may be used. Here the tape has an enlarged end 8 and a reduced end 9, the end 8 being made as short as convenient and the end 9 being made as long as convenient for a purpose that will appear below. One edge of the end 9 has a vernier scale 10 corresponding to the scale 5, above described, and the end 8 is provided with a corresponding scale 11 which is not put on the outer edge of this part, but on the edge of a slot 12 so as to cooperate with the edge 10, as above described. To hold the tape in position, the end 9 is first run through a slot 14 from the face which is marked to the opposite face and then from this opposite face out to the face which is marked and thence by the edges of the slot 12 so that the edge 10 will cooperate with the edge 11 and readings may be had precisely as above described. For external readings, the scales must be modified to compensate for the thickness of the tape and for internal measurements the same is true. For accurate reading, the scales 10 and 11 should not be used both for interior and exterior diameters.

It will be noticed that once the end 9 is passed through the slots 14 and 13 it will stay in position so that it is easy to make readings because the tape will hold its positions because of these slots. In Figure 5 the tape is shown suitable for measuring external diameters. If it were to be used for measuring internal diameters, the marking would have to be changed, as above described, and the end 9 would be run in the opposite way through the slot 14 and 13.

Having thus described my invention, what I claim is:

1. A tape for measuring cylinders so as to determine their diameters, said tape being composed of a wide body portion with offset ends extending therefrom with aligning edges, one of said edges being provided with a scale and the other with a vernier scale to correspond, the scale being of a convenient dimension multiplied by $\pi$ with a correction to compensate for the thickness of the tape.

2. In a tape of the class described having a part with a scale and a second part with a vernier which is adapted to cooperate with said scale.

3. A one piece tape having two opposite edges which are adapted to align and co-act so that markings on said edges will act as a vernier, whereby the tape may be used to determine diameters from cylindrical surfaces.

In testimony whereof, I have hereunto set my hand this 30th day of March, 1923.

ROBERT L. SCHAAP.